(12) United States Patent
Hoek (10) Patent No.: US 8,998,151 B2
(45) Date of Patent: Apr. 7, 2015

(54) CABLE ORGANIZER

(76) Inventor: Ross Matthew Hoek, Holland, MI (US)

( * ) Notice: Subject to any disclaimer, the term of this patent is extended or adjusted under 35 U.S.C. 154(b) by 484 days.

(21) Appl. No.: 12/974,885

(22) Filed: Dec. 21, 2010

(65) Prior Publication Data

US 2011/0147542 A1 Jun. 23, 2011

Related U.S. Application Data

(60) Provisional application No. 61/288,584, filed on Dec. 21, 2009.

(51) Int. Cl.
*F16L 3/22* (2006.01)
*F16L 3/223* (2006.01)

(52) U.S. Cl.
CPC ..................... *F16L 3/223* (2013.01)

(58) Field of Classification Search
CPC ............. F16L 3/223; F16L 3/22; F16L 3/221; H02G 3/305; A61M 5/1418
USPC ......... 248/68.1, 49, 75, 74.2, 74.3; 174/72 A, 174/135; 211/85.13; D8/356; D24/128; 24/129 R, 130, 129 D, 115 A
See application file for complete search history.

(56) References Cited

U.S. PATENT DOCUMENTS

| | | | |
|---|---|---|---|
| 2,243,387 A | 5/1941 | Livingston |
| 2,351,379 A | 6/1944 | Wehringer |
| 2,364,262 A | 12/1944 | Wehringer |
| 2,397,291 A | 3/1946 | Robertson |
| 2,585,054 A | 2/1952 | Stachura |
| 2,960,561 A | 11/1960 | Plummer |
| D190,429 S | 5/1961 | Hoagland |
| 3,038,558 A | 6/1962 | Plummer |
| 3,089,210 A | 5/1963 | Ritter |
| 3,092,530 A | 6/1963 | Plummer |
| 3,204,908 A | 9/1965 | Brown |
| 3,279,720 A | 10/1966 | Garrett |
| 3,290,453 A | 12/1966 | Jensen |
| D206,876 S | 2/1967 | Emley et al. |
| D209,329 S | 11/1967 | Coderre |
| 3,459,870 A | 8/1969 | Plummer |
| 3,568,308 A | 3/1971 | Plaskon |
| 3,602,455 A | 8/1971 | Lewis |
| 3,696,920 A | 10/1972 | Lahay |
| D229,484 S | 12/1973 | Brown |
| 3,890,459 A | 6/1975 | Caveney |
| 4,018,983 A | 4/1977 | Pedlow |
| 4,114,241 A | 9/1978 | Bisping |
| D256,303 S | 8/1980 | Rieman |
| 4,244,544 A | 1/1981 | Kornat |
| D271,903 S | 12/1983 | Kaufman |
| D272,785 S | 2/1984 | Rumbaugh |

(Continued)

*Primary Examiner* — Terrell McKinnon
*Assistant Examiner* — Ingrid M Weinhold
(74) *Attorney, Agent, or Firm* — King & Partners, PLC (57) ABSTRACT

A cable organizer including a front surface and a rear surface, wherein the front surface and the rear surface define a width therebetween; a first end and a second end, wherein the first end and the second end define a length therebetween; a bottom surface, wherein the bottom surface is adapted for placement proximate a work surface; a top surface, wherein the top surface comprises at least one aperture for receiving a cable therethrough, and wherein the top surface comprises at least one of a tab and detent which is controllably bendable, thereby facilitating releasable insertion of a cable into at least one cable channel such that the cable is retained in the at least one cable channel during normal use and removable by a user upon upward displacement of the cable by the user.

1 Claim, 9 Drawing Sheets

(56) References Cited

U.S. PATENT DOCUMENTS

| | | | | |
|---|---|---|---|---|
| D272,787 S | | 2/1984 | Rumbaugh | |
| 4,534,354 A | | 8/1985 | Bonner, Jr. et al. | |
| D287,916 S | * | 1/1987 | DelGarbino et al. | D6/567 |
| 4,721,268 A | | 1/1988 | Lerner et al. | |
| D299,311 S | * | 1/1989 | Whitley, II | D8/356 |
| D303,192 S | | 9/1989 | Bogar, III | |
| 4,863,020 A | | 9/1989 | Klemow | |
| 4,865,412 A | | 9/1989 | Patterson | |
| 4,878,586 A | | 11/1989 | Bancroft et al. | |
| 4,971,271 A | | 11/1990 | Sularz | |
| 4,977,011 A | | 12/1990 | Smith | |
| 5,020,759 A | | 6/1991 | Weber | |
| 5,023,404 A | | 6/1991 | Hudson et al. | |
| 5,130,496 A | | 7/1992 | Jenkins | |
| 5,160,273 A | | 11/1992 | Carney | |
| 5,168,999 A | | 12/1992 | Lee et al. | |
| 5,178,163 A | | 1/1993 | Yewer, Jr. | |
| 5,209,441 A | | 5/1993 | Satoh | |
| 5,307,243 A | | 4/1994 | Sharp et al. | |
| 5,316,246 A | | 5/1994 | Scott et al. | |
| D354,904 S | * | 1/1995 | Halsten | D8/356 |
| 5,377,360 A | | 1/1995 | Fleitman | |
| 5,385,490 A | | 1/1995 | Demeter et al. | |
| 5,395,399 A | | 3/1995 | Rosenwald | |
| 5,397,298 A | | 3/1995 | Mazza et al. | |
| 5,448,015 A | | 9/1995 | Jamet et al. | |
| 5,515,472 A | | 5/1996 | Mullaney et al. | |
| D374,013 S | | 9/1996 | Hislop et al. | |
| 5,566,269 A | | 10/1996 | Eberle, Jr. et al. | |
| 5,571,035 A | | 11/1996 | Ferrill | |
| 5,600,098 A | | 2/1997 | Kazaks | |
| D378,408 S | | 3/1997 | Pyeatt et al. | |
| 5,607,126 A | | 3/1997 | Cordola et al. | |
| 5,615,850 A | | 4/1997 | Cloninger | |
| 5,628,647 A | | 5/1997 | Rohrbaugh et al. | |
| 5,788,092 A | | 8/1998 | Teeney | |
| 5,899,770 A | | 5/1999 | Ezawa | |
| 5,954,301 A | | 9/1999 | Joseph et al. | |
| 5,967,801 A | | 10/1999 | Martin et al. | |
| 6,007,368 A | | 12/1999 | Lorenz et al. | |
| 6,012,940 A | * | 1/2000 | Wheeler | 439/369 |
| D425,987 S | * | 5/2000 | Goldstein et al. | D24/128 |
| 6,083,052 A | | 7/2000 | Adams et al. | |
| 6,109,460 A | | 8/2000 | Herlevi et al. | |
| 6,206,330 B1 | | 3/2001 | Oi et al. | |
| 6,227,502 B1 | | 5/2001 | Derman | |
| 6,238,235 B1 | | 5/2001 | Shavit et al. | |
| 6,241,198 B1 | | 6/2001 | Maruyama | |
| 6,285,565 B1 | | 9/2001 | Aberg et al. | |
| 6,360,051 B1 | * | 3/2002 | Daoud | 385/137 |
| 6,415,932 B1 | | 7/2002 | Fiscus et al. | |
| 6,458,104 B2 | | 10/2002 | Gautsche | |
| D468,996 S | * | 1/2003 | Sarkinen et al. | D8/356 |
| 6,607,169 B1 | | 8/2003 | Gershfeld | |
| D479,328 S | | 9/2003 | Reynolds et al. | |
| D488,054 S | * | 4/2004 | Myers | D8/356 |
| 6,768,858 B2 | * | 7/2004 | Tinucci et al. | 385/134 |
| D512,905 S | * | 12/2005 | Byers | D8/382 |
| D541,752 S | | 5/2007 | Van Haaste | |
| D568,723 S | | 5/2008 | Morgan | |
| D587,101 S | | 2/2009 | Morgan | |
| D587,102 S | | 2/2009 | Morgan | |
| D589,782 S | * | 4/2009 | Rowell et al. | D8/356 |
| 7,514,630 B2 | | 4/2009 | Anderson | |
| D598,275 S | | 8/2009 | Rowell et al. | |
| 7,712,709 B2 | * | 5/2010 | Winchester | 248/89 |
| D639,684 S | * | 6/2011 | Essel | D10/65 |
| D644,501 S | * | 9/2011 | Chen | D8/356 |
| 2004/0104315 A1 | * | 6/2004 | Betz | 248/74.2 |
| 2004/0118982 A1 | | 6/2004 | Shillings et al. | 248/68.1 |
| 2005/0189453 A1 | * | 9/2005 | DeGuevara | 248/68.1 |
| 2007/0235597 A1 | * | 10/2007 | Winchester | 248/68.1 |
| 2009/0065249 A1 | * | 3/2009 | Silvers | 174/72 A |
| 2010/0132979 A1 | * | 6/2010 | Chen | 174/135 |

\* cited by examiner

Fig. 30

CABLE ORGANIZER

CROSS-REFERENCE TO RELATED APPLICATION(S)

This application claims the benefit of U.S. Provisional Application Ser. No. 61/288,584, filed Dec. 21, 2009, entitled "Cable Organizer" which is hereby incorporated herein by reference in its entirety, including all references cited therein. This application relates to U.S. Design application Ser. No. 29/348,182, filed Dec. 7, 2009, entitled "Cable Organizer," U.S. Design application Ser. No. 29/348,177, filed Dec. 7, 2009, entitled "Cable Organizer," U.S. Design application Ser. No. 29/348,181, filed Dec. 7, 2009, entitled "Cable Organizer," U.S. Design application Ser. No. 29/349,972, filed May 24, 2010, entitled "Cable Organizer," U.S. Design application Ser. No. 29/349,975, filed May 24, 2010, entitled "Cable Organizer," and U.S. Design application Ser. No. 29/349,973, filed May 24, 2010, entitled "Cable Organizer"—all of which are hereby incorporated herein by reference in their entirety.

BACKGROUND OF THE INVENTION

1. Field of the Invention

The present invention relates in general to a cable organizer and more particularly, but not by way of limitation, to a cable organizer which is adapted to releasably contain one or more cables, cords, conduits, and/or wires therein.

2. Background Art

Cable, cord, conduit, and/or wire organizers have been known in the art for several years and are the subject of a plurality of United States patents. See, for example, U.S. Pat. No. 4,721,268 entitled "MODULAR POWER CORD AND CABLE ORGANIZER," U.S. Pat. No. 5,600,098 entitled "ELECTRONIC CABLE ORGANIZER," U.S. Pat. No. 6,238,235 entitled "CABLE ORGANIZER," U.S. Pat. No. 6,285,565 entitled "CABLE SUPPORT APPARATUS," U.S. Pat. No. 6,360,051 entitled "SPLICE HOLDER WITH IMPROVED ACCESS FEATURE," U.S. Pat. No. 6,607,169 entitled "CABLE ORGANIZER FOR ATTACHMENT TO AN EDGE OF A TABLE," and U.S. Pat. No. D488,054 entitled "CABLE ORGANIZER AND HOLDER," all of which are hereby incorporated herein by reference in their entirety—including all references cited therein.

U.S. Pat. No. 4,721,268 appears to disclose a modular power cord and cable organizer consisting of identical elongated containers which can be used singularly or attached in multiple units, the combination of which creates a base upon which other objects or small electrical appliances may be placed for convenience. The device allows shortening and efficiently organizing power cords, wires and cables especially where a group of small electrical components are used in combination and simultaneously as in, for example, data processing workstations or household work surfaces.

U.S. Pat. No. 5,600,098 appears to disclose an organizer for securing a plurality of insulated electrical conductors such as PC interconnect and power cables. The organizer comprises a body constructed of a single piece of thin, flat, flexible fabric having a rectangular configuration with first and second end edges and first and second side edges. A fastening mechanism is attached to the side edges to bring them together as the body is wrapped around the cables. The fastening mechanism is preferably a zipper, straps or a hook and loop type fastener. One or more access apertures may be disposed in the body.

U.S. Pat. No. 6,238,235 appears to disclose a cable organizer including an elongated body having two opposite ends, one called a cable receiving end and the other called a terminal receiving end, and a plurality of wire-receiving passages formed in the elongated body and separated from each other by electrically conductive portions in the body, each wire-receiving passage extending from the cable receiving end to the terminal receiving end and being open at both ends, each wire-receiving passage being adapted for guiding therethrough a plurality of wires of multi-pair communication cable from the cable receiving end to the terminal receiving end, and being adapted for arranging a plurality of wires of multi-pair communication cable at the terminal receiving end for connection with a modular plug. The wire-receiving passages have parallel but not coplanar surface portions that are joined by an intermediate portion. This causes a different wire-receiving passage cross-section at the cable-receiving end compared to the terminal-receiving end.

U.S. Pat. No. 6,285,565 appears to disclose a cable support used in a structure for accommodating electronic equipment, for example printed circuit boards in a subrack. The support includes an elongated rail with cable guiding surfaces for guiding a cable rail along the structure. At least one pair of curved fingers are arranged with mutual intervals at an angle to the longitudinal axis of said rail. A tongue is located in the interval between two adjacent fingers.

U.S. Pat. No. 6,360,051 appears to disclose a splice holder for securing and retaining fiber optic splices. The splice holder improves access to individual splices and minimizes interference to adjacent splices during removal. The splice holder comprises a hollow base having a first flat portion and a second enclosing portion defining a hollow longitudinal space therebetween. A plurality of parallel, spaced apart longitudinal members extend from the second portion away from the hollow space. Adjacent pairs of members define a channel for retaining a splice. Within the hollow space is a transversely extending wall for structural support of the second portion, which divides the space into two cavities. The cavities provide improved access to the underside of a splice.

U.S. Pat. No. 6,607,169 appears to disclose a cable organizer for attachment to an edge of a table and organizing cables for connecting to equipment on a tabletop. The cable organizer has a base with a cable guide extending at a substantially ninety-degree angle for receiving the cables and teeth extending at a substantially forty-five-degree angle. Further provided is a cable retainer releasably mounted to the teeth such that the cable retainer and the teeth form cable-receiving passages for guiding the cables from the cable guide and for arranging the cables for connection to the equipment on the table top. Also provided is a clamp means fixedly attached to the base for attachment to the edge of the table.

U.S. Pat. No. D488,054 appears to disclose an ornamental embodiment of a cable organizer.

While the above-identified cable organizers exist, their structural configurations remain non-desirous and/or problematic.

It is therefore an object of the present invention, to provide a cable organizer as disclosed infra which, among other things, remedies any structural detriments and/or complications associated with the use of conventional cable organizers.

SUMMARY OF THE INVENTION

The present invention is directed to, in one embodiment, a cable organizer comprising: (a) a front side and a rear side, wherein the front side and the rear side define a width therebetween; (b) a first end and a second end, wherein the first end and the second end define a length therebetween; (c) a bottom surface, wherein the bottom surface is adapted for placement upon a work surface; and (d) a top surface, wherein the top surface comprises at least one aperture for receiving a cable therethrough, and wherein the top surface comprises at least two tabs which are controllably bendable, thereby facilitating releasable insertion of a cable into at least one cable channel such that the cable is retained in the at least one cable channel during normal use and removable by a user upon upward displacement of the cable by the user.

The present invention is also directed to, in one embodiment, a cable organizer comprising: (a) a bottom surface, wherein the bottom surface is adapted for placement upon a work surface; (b) a top surface, wherein the top surface comprises one or more apertures for receiving a cable therethrough; (c) a front side and a rear side, wherein the front side and the rear side define a width therebetween; (d) a first end and a second end, wherein the first end and the second end define a length therebetween; and (e) one or more cable channels capable of containing one or more cables, wherein the cable channels emanate from the front side to the rear side of the cable organizer, and wherein the cable channels comprise a substantially triangular cross-section. In this embodiment the cable organizer preferably comprises a unitary body.

In a preferred embodiment of the present invention, the cable channel comprises a substantially frusto-triangular cross-section.

In another preferred embodiment of the present invention, cable channels comprise a base member, an upper left side member, and an upper right side member, wherein the base member and the left side member form a first arcuate corner, wherein the base member and the right side member form a second arcuate corner, and wherein the upper left side member and the upper right side member are spaced apart from one another per the at least one aperture of the top surface.

In yet another preferred embodiment of the present invention, the cable organizer includes a first cable channel and a second cable channel, each cable channel having a base member, an upper left side member, and an upper right side member, wherein the base member of the first cable channel is parallel to the bottom surface of the cable organizer, and the base member of the second cable channel is non-parallel to the bottom surface of the cable organizer.

In a preferred embodiment of the present invention, the cable organizer includes approximately two to approximately ten cable channels.

In one aspect of the present invention, the bottom surface is preferably planar and/or optionally striated along the length and/or width of the cable organizer.

In another preferred embodiment of the present invention, the bottom surface comprises a recessed region adapted for containing double-sided adhesive tape.

In yet another preferred embodiment of the present invention, the one or more apertures of the top surface comprise a width that is greater proximate the front and rear sides than a midpoint therebetween. Optionally the top surface may be arcuate. Additionally, in one embodiment, the top surface comprises one or more tabs which are bendable during insertion of a cable into the cable channels.

The present invention is also directed to a cable organizer, comprising: (a) a front side and a rear side, wherein the front side and the rear side define a width therebetween; (b) a first end and a second end, wherein the first end and the second end define a length therebetween; (c) a bottom surface, wherein the bottom surface is planar and contacts a work surface; (d) a top surface, wherein the top surface includes an aperture for receiving a cable therethrough, wherein the aperture comprises a width that is greater proximate the front and rear sides than a midpoint therebetween, wherein the top surface is arcuate, and wherein the top surface includes at least two tabs which are bendable during insertion of the cable into one or more cable channels; and (e) one or more cable channels having a cable received therein, wherein the one or more cable channels emanate continuously from the front side to the rear side of the cable organizer, wherein the cable channels comprise a substantially triangular cross-section, wherein the cable channels comprise a base member, an upper left side member, and an upper right side member, wherein the base member and the upper left side member form a first arcuate corner, wherein the base member and the upper right side member form a second arcuate corner, and wherein the upper left side member and the upper right side member are spaced apart from one another per the at least one aperture of the top surface.

The present invention is further directed to a cable organizer comprising: (a) a bottom surface, wherein the bottom surface is adapted for placement upon a work surface; (b) a top surface, wherein the top surface comprises at least one aperture for receiving a cable therethrough, wherein the top surface comprises a tab which is bendable during insertion of a cable into at least one cable channel; (c) a front side and a rear side, wherein the front side and the rear side define a width therebetween; (d) a first end and a second end, wherein the first end and the second end define a length therebetween; and (e) at least one cable channel capable of containing at least one cable, wherein the at least one cable channel emanates from the front side to the rear side of the cable organizer, and wherein the cable channel comprises a substantially triangular cross-section.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be understood that the invention is not necessarily limited to the particular embodiments illustrated herein.

The invention will now be described with reference to the drawings wherein.

DETAILED DESCRIPTION OF THE INVENTION

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

In accordance with the present invention, the cable organizers disclosed herein, among other things, are configured to facilitate releasable insertion of a cable into one or more cable channels such that the cable is retained in the one or more channels during normal use and removable by a user upon upward displacement of the cable by the user.

Figure 1:
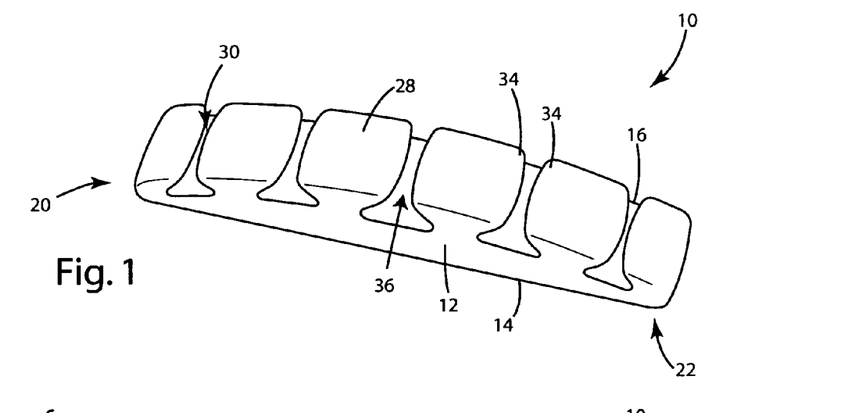
FIG. 1 of the drawings is an elevated perspective view of a cable organizer fabricated in accordance with the present invention showing five cable channels.
Figure 2:
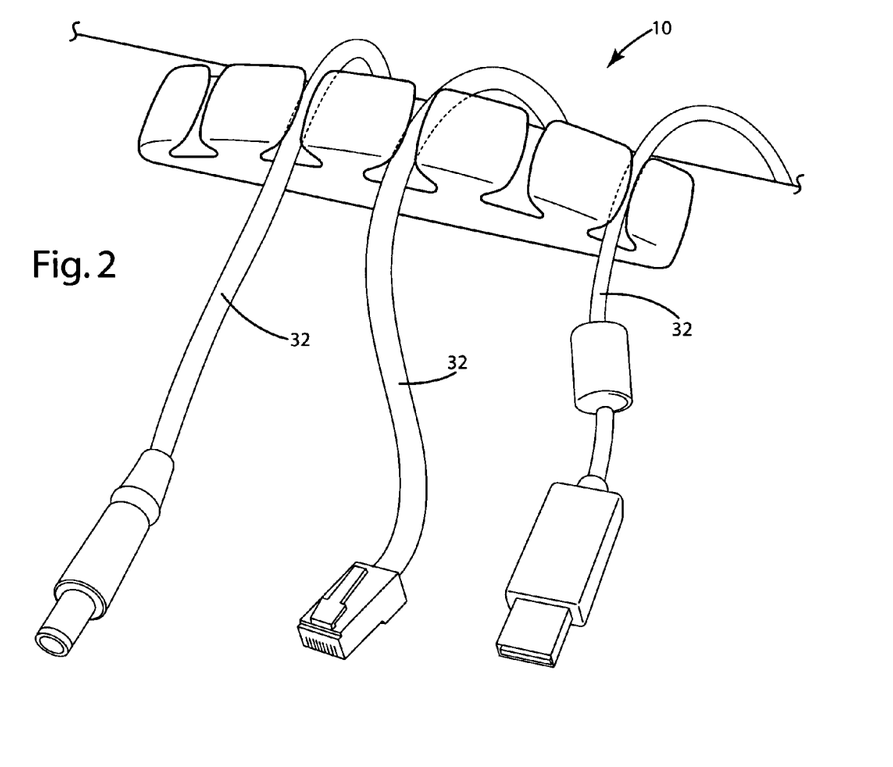
FIG. 2 of the drawings is an elevated perspective view of a cable organizer fabricated in accordance with the present invention showing five cable channels associated with three cables on a work surface.
Figure 3:
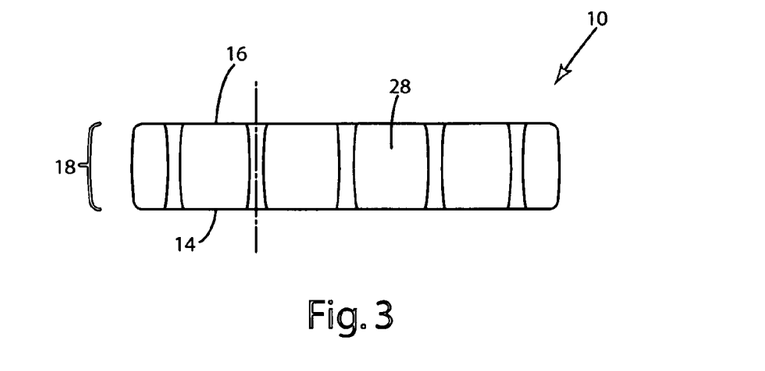
FIG. 3 of the drawings is a top plan view of a cable organizer fabricated in accordance with the present invention.
Figure 4:
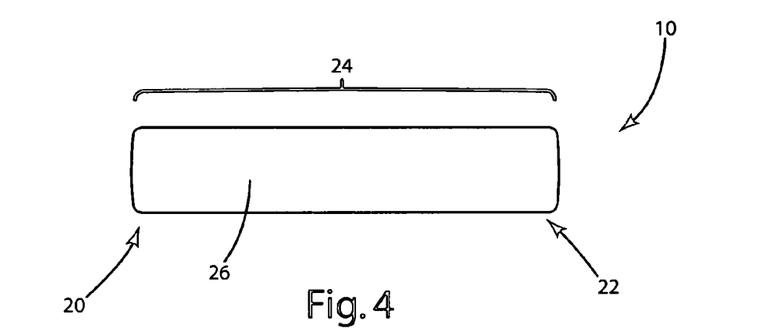
FIG. 4 of the drawings is a bottom plan view of a cable organizer fabricated in accordance with the present invention showing a planar surface.
Figure 5:
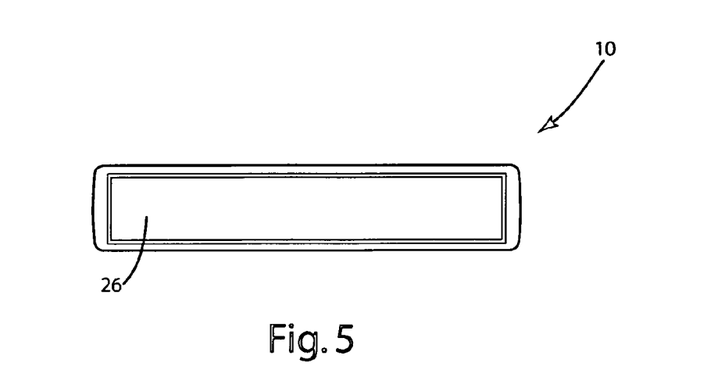
FIG. 5 of the drawings is a bottom plan view of a cable organizer fabricated in accordance with the present invention showing recessed area for accommodating adhesive.
Figure 6:
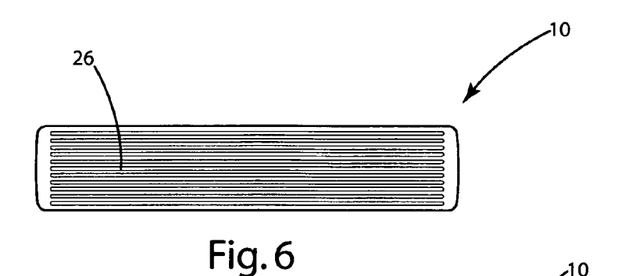
FIG. 6 of the drawings is a bottom plan view of a cable organizer fabricated in accordance with the present invention showing striations running generally parallel to the length of the cable organizer.
Figure 7:
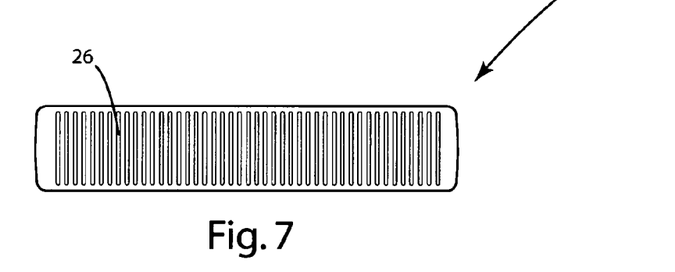
FIG. 7 of the drawings is a bottom plan view of a cable organizer fabricated in accordance with the present invention showing striations running generally perpendicular to the length of the cable organizer.

Referring now to the collective drawings (i.e., FIGS. 1-18), and to FIG. 1 in particular, a perspective view of a first embodiment of cable organizer 10 is shown which generally comprises body 12 having: front side 14 and rear side 16, wherein the front side and the rear side define width 18 therebetween; first end 20 and second end 22, wherein the first end and the second end define length 24 therebetween; bottom surface 26 (e.g., FIGS. 4-7) wherein the bottom surface is adapted for placement upon a work surface; top surface 28, wherein the top surface comprises at least one aperture 30 for receiving cable 32 (e.g., FIG. 2) therethrough; and wherein the top surface comprises tabs 34 which are controllably bendable, thereby facilitating releasable insertion of cable 32 into cable channel 36 such that cable 32 is retained in cable channel 36 during normal use and removable by a user upon upward displacement of cable 32 by the user.

It will be understood that cable organizer 10 may be fabricated from a unitary piece of material or, alternatively, from a plurality of pieces. It will be further understood that FIGS. 1-30 are merely representations of cable organizers. As such, some of the components may be distorted from their actual scale for pictorial clarity and/or image enhancement.

Preferably cable organizer 10 is fabricated from a natural and/or synthetic plastic resin. However, any one of a number of other materials that would be known to those having ordinary skill in the art are likewise contemplated for use.

Figure 9:
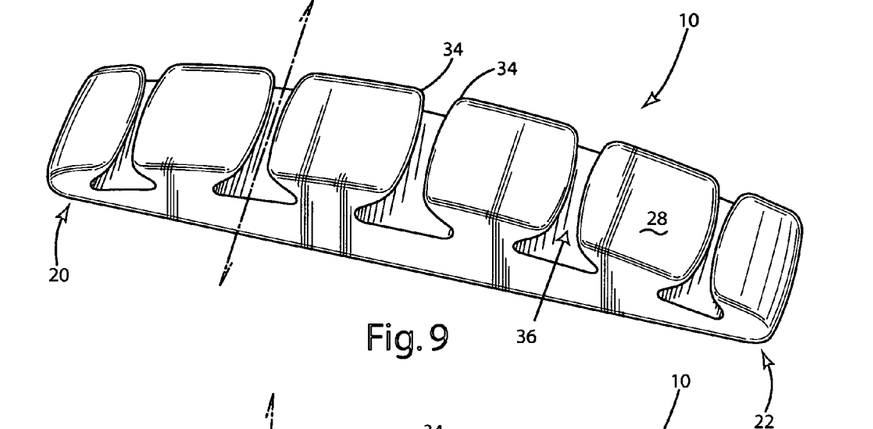
FIG. 9 is a perspective view of a five-channel cable organizer fabricated in accordance with the present invention.
Figure 9A:
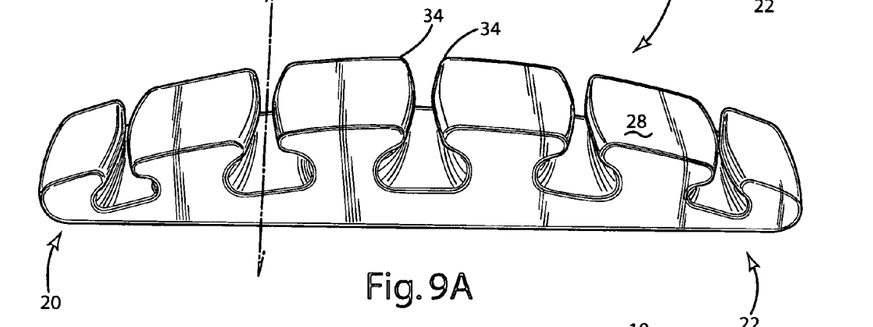
Figure 10:
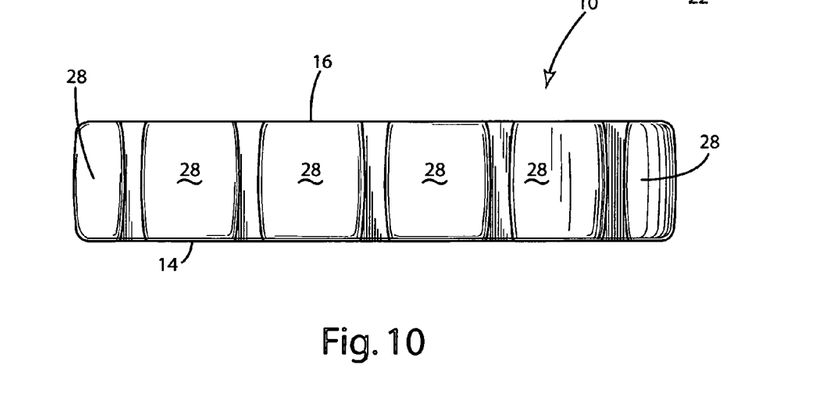
FIG. 10 is a top plan view of a five-channel cable organizer fabricated in accordance with the present invention.
Figure 11:
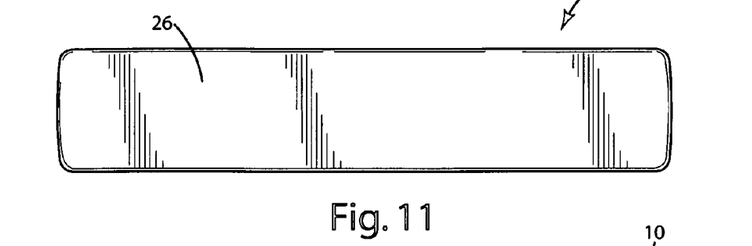
FIG. 11 is a bottom plan view of a five-channel cable organizer fabricated in accordance with the present invention.
Figure 12:
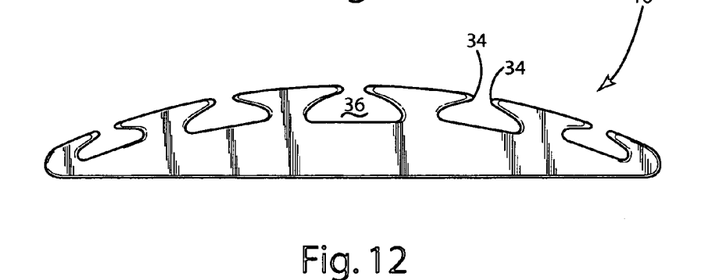
FIG. 12 is a side elevation view of a five-channel cable organizer fabricated in accordance with the present invention.
Figure 12A:
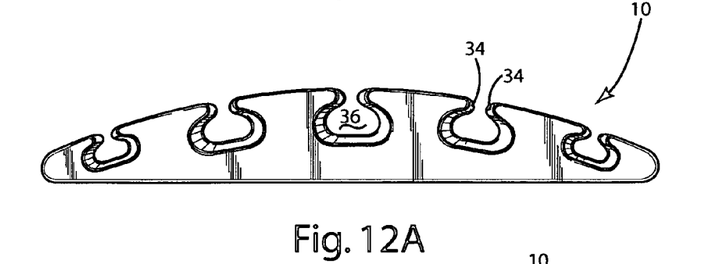
Figure 13:
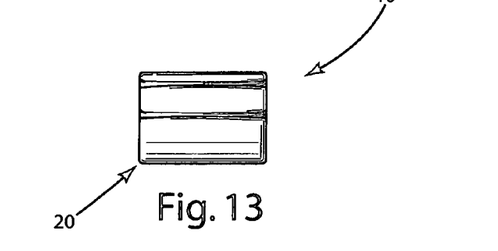
FIG. 13 is an end view a five-channel cable organizer fabricated in accordance with the present invention.
Figures 14, 14A:
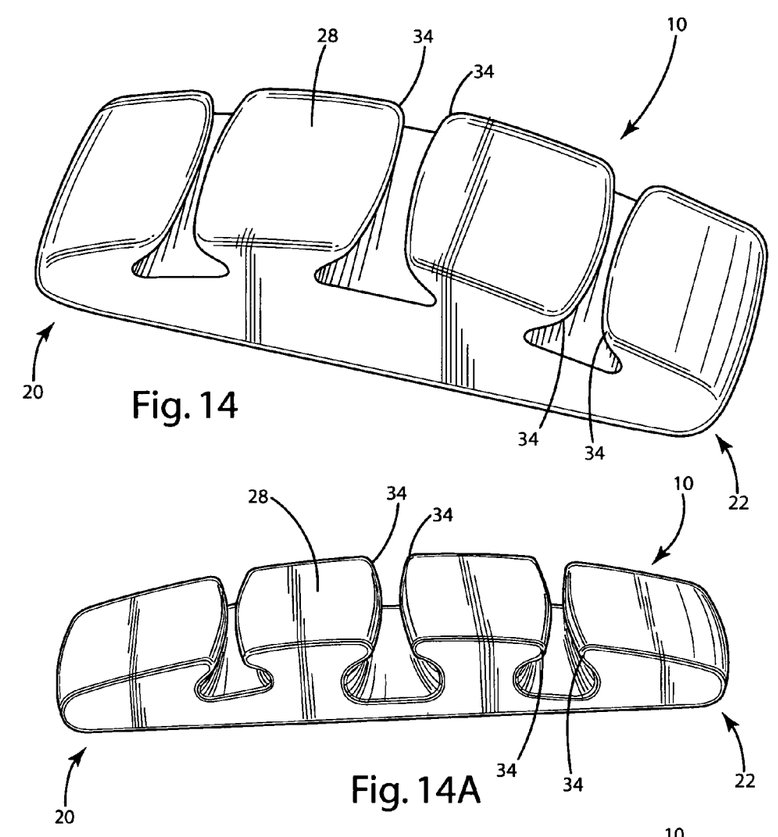
FIG. 14 is a perspective view of a three-channel cable organizer fabricated in accordance with the present invention.
Figure 15:
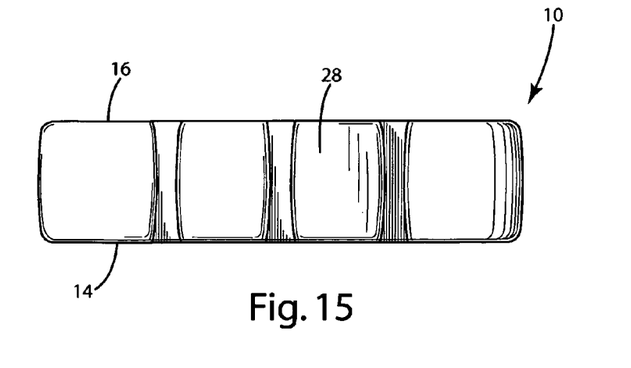
FIG. 15 is a top plan view of a three-channel cable organizer fabricated in accordance with the present invention.
Figure 16:
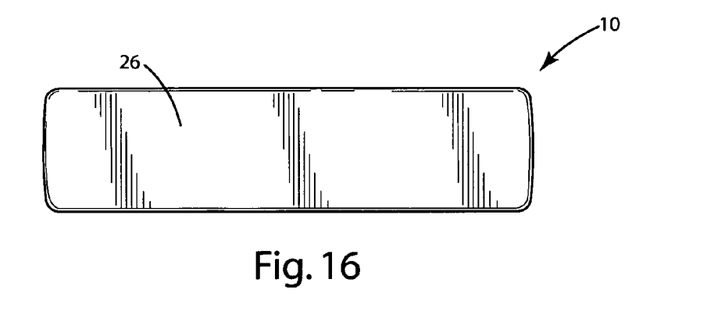
FIG. 16 is a bottom plan view of a three-channel cable organizer fabricated in accordance with the present invention.
Figure 17:
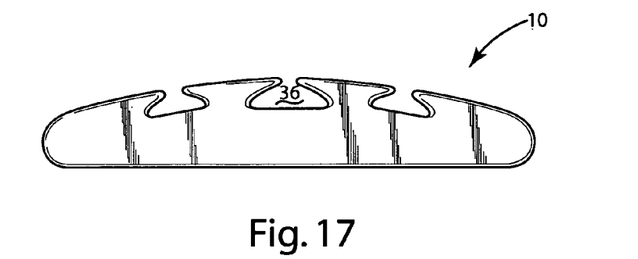
FIG. 17 is a side elevation view of a three-channel cable organizer fabricated in accordance with the present invention.
Figures 17A, 18, 19:
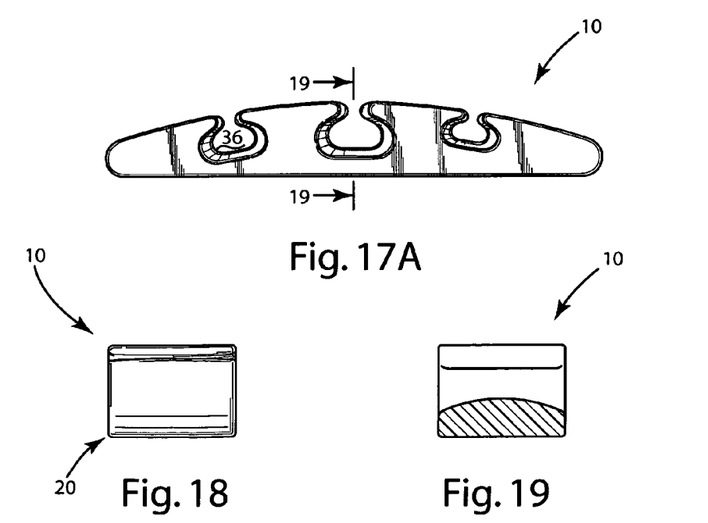
FIG. 18 is an end view a three channel cable organizer fabricated in accordance with the present invention.
FIGS. 19-30 are cable organizers fabricated in accordance with the present invention.
Figure 20:
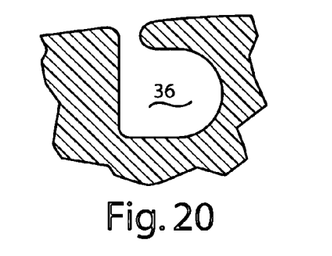
Figure 21:
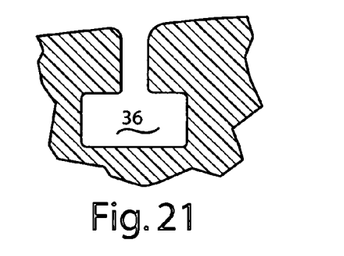
Figure 22:
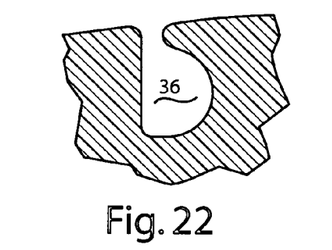
Figure 23:
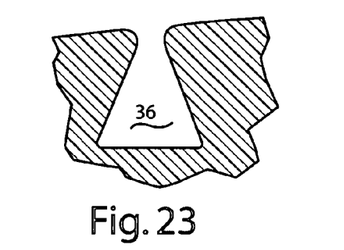
Figure 24:
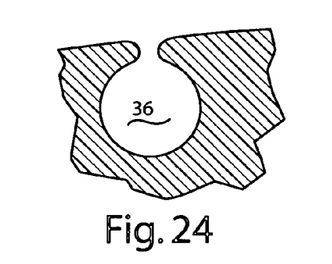
Figure 25:
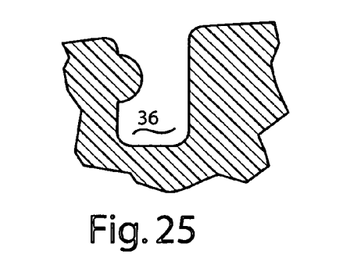
Figure 26:
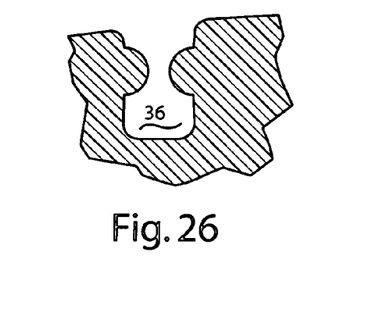
Figure 27:
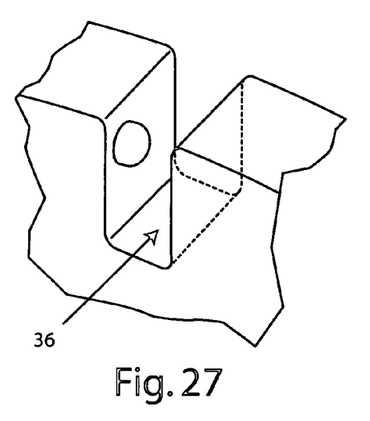
Figure 28:
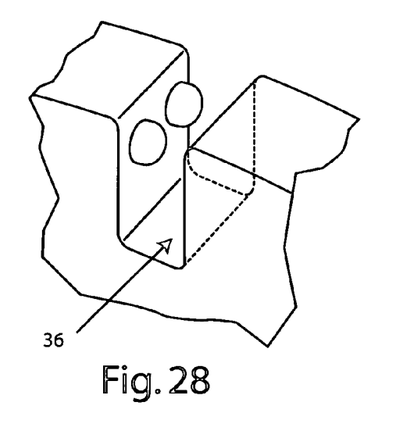
Figure 29:
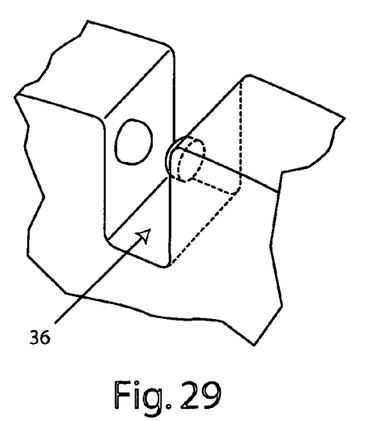
Figure 30:
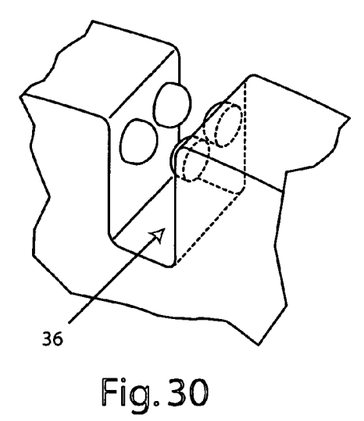

In one embodiment of the present invention, top surface 28 includes aperture 30 for receiving cable 32 therethrough, wherein the aperture comprises a width that is greater proximate the front and rear sides than a midpoint therebetween (e.g., FIGS. 9-10). Additionally, top surface 28 is preferably arcuate, and includes tabs 34 which are bendable during insertion of the cable into at least one cable channel.

Referring now to FIGS. 1, 9, 12, and 17, cable organizer 10 preferably includes a cable channel which comprises a substantially frusto-triangular cross-section.

Referring now to FIGS. 4-7, cable organizer 10 may include bottom surface 26, which is planar, longitudinally striated, latitutinally striated, and/or recessed for received an adhesive—such as double-sided sticky tape.

Figure 8:
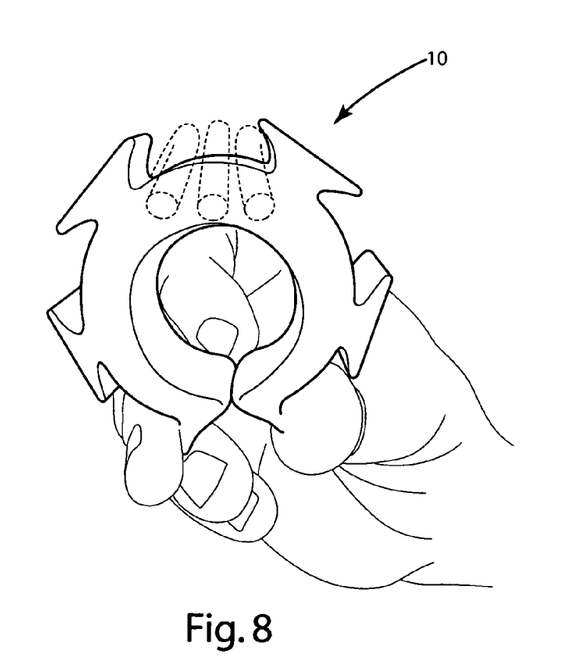
FIG. 8 of the drawings is a elevated perspective view of a cable organizer fabricated in accordance with the present invention showing sufficient flexibility such that both first and second ends are capable of contacting each other via manipulation by a user.

As is best shown in FIG. 8, cable organizer 10, may optionally be sufficiently flexible such that both first and second ends 20 and 22, respectively, are capable of contacting each other via manipulation by a user.

In accordance with the present invention, cable organizer 10 may include three channel bodies (e.g., FIGS. 14-18), five channel bodies (e.g., FIGS. 1-13), among others.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A cable organizer, consisting of:
   a front surface and a rear surface, wherein the front surface and the rear surface define a width therebetween;
   a first end and a second end, wherein the first end and the second end define a length therebetween;
   a bottom surface, wherein the bottom surface is planar and contacts a surface;
   a top surface, wherein the top surface includes an aperture for receiving a cable therethrough, wherein the aperture comprises a width that is greater proximate the front and rear surfaces than a midpoint therebetween, wherein the top surface is arcuate, and wherein the top surface includes at least one tab; and
   at least one cable channel for receiving a cable therein, wherein the at least one cable channel emanates continuously from the front surface to the rear surface of the cable organizer, wherein the cable channel comprises a substantially triangular cross-section, wherein the at least one cable channel comprises a base member, an upper left side member, and an upper right side member, wherein the base member and the upper left side member form a first rounded arcuate corner, wherein the base member and the upper right side member form a second rounded arcuate corner, and wherein the upper left side member and the upper right side member are spaced apart from one another per the at least one aperture of the top surface, wherein the at least one tab is bendable during insertion of the cable through the aperture into the at least one cable channel.

* * * * *